(12) United States Patent
Pugh et al.

(10) Patent No.: US 10,942,370 B2
(45) Date of Patent: *Mar. 9, 2021

(54) METHOD AND APPARATUS FOR ENCAPSULATING A RIGID INSERT IN A CONTACT LENS FOR CORRECTING VISION IN ASTIGMATIC PATIENTS

(71) Applicant: Johnson & Johnson Vision Care, Inc., Jacksonville, FL (US)

(72) Inventors: Randall B. Pugh, Jacksonville, FL (US); Daniel B. Otts, Mountain View, CA (US); James D. Riall, St. Johns, FL (US); Sharika Snook, St. Augustine, FL (US); Karson S. Putts, Lafayette, IN (US); Edward R. Kernick, Jacksonville, FL (US); Frederick A. Flitsch, New Windsor, NY (US); Camille Higham, Jacksonville, FL (US)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/274,046

(22) Filed: Feb. 12, 2019

(65) Prior Publication Data
US 2019/0179166 A1 Jun. 13, 2019

Related U.S. Application Data

(63) Continuation of application No. 14/612,029, filed on Feb. 2, 2015, now Pat. No. 10,203,521, which is a
(Continued)

(51) Int. Cl.
*G02C 7/04* (2006.01)
*G02C 7/06* (2006.01)
(Continued)

(52) U.S. Cl.
CPC ............... *G02C 7/041* (2013.01); *G02C 7/04* (2013.01); *G02C 7/048* (2013.01); *G02C 7/049* (2013.01);
(Continued)

(58) Field of Classification Search
CPC .......... G02C 7/04; G02C 7/041; G02C 7/042; G02C 7/043; G02C 7/044; G02C 7/045; G02C 7/048; G02C 7/049
(Continued)

(56) References Cited

U.S. PATENT DOCUMENTS 3,973,838 A  8/1976  Page
4,166,255 A  8/1979  Graham
(Continued)

FOREIGN PATENT DOCUMENTS

EP  613694 A1   9/1994
EP  2512777 B1  10/2012
(Continued)

OTHER PUBLICATIONS

European Search Report for Application No. EP 14 16 0109 Date of Completion of Report Jun. 30, 2014.
(Continued)

*Primary Examiner* — Darryl J Collins

(57) ABSTRACT

The present invention, as described above and as further defined by the claims below, provides methods for forming an Ophthalmic Lens that encapsulates a Rigid Insert, wherein the Rigid Insert may be tailored to correct specific astigmatic characteristics of an eye and apparatus for implementing such methods, as well as Ophthalmic Lenses formed with the Rigid Inserts.

16 Claims, 3 Drawing Sheets

Related U.S. Application Data continuation of application No. 13/833,967, filed on Mar. 15, 2013, now Pat. No. 8,974,055.

(51) Int. Cl.
  *G02C 7/10* (2006.01)
  *G02C 7/12* (2006.01)
(52) U.S. Cl.
  CPC ............... *G02C 7/06* (2013.01); *G02C 7/10* (2013.01); *G02C 7/12* (2013.01); *G02C 2202/06* (2013.01); *G02C 2202/12* (2013.01)
(58) Field of Classification Search
  USPC .................. 351/159.22, 159.24, 159.36
  See application file for complete search history.

(56) References Cited

U.S. PATENT DOCUMENTS

| | | | |
|---|---|---|---|
| 4,582,402 A | 4/1986 | Knapp | |
| 4,718,906 A | 1/1988 | Mackool | |
| 5,100,225 A | 3/1992 | Rothe | |
| 5,358,995 A | 10/1994 | Lai et al. | |
| 6,139,146 A | 10/2000 | Zhang | |
| 6,491,393 B1 | 12/2002 | Appleton | |
| 6,874,888 B1 | 4/2005 | Dudai | |
| 7,040,757 B2 | 5/2006 | Hall et al. | |
| 7,101,042 B2 | 9/2006 | Perel et al. | |
| 7,216,974 B2 | 5/2007 | Meyers et al. | |
| 7,322,694 B2 | 1/2008 | Dahi et al. | |
| 7,883,207 B2 | 2/2011 | Iyer et al. | |
| 8,703,891 B2 | 4/2014 | Broad | |
| 8,974,055 B2 * | 3/2015 | Pugh .................... | G02C 7/06 351/159.22 |
| 9,164,297 B2 * | 10/2015 | Pugh .................... | G02C 7/048 |
| 10,203,521 B2 * | 2/2019 | Pugh .................... | G02C 7/06 |
| 2004/0027501 A1 | 2/2004 | Blum et al. | |
| 2004/0141150 A1 | 7/2004 | Roffman et al. | |
| 2004/0212779 A1 | 10/2004 | Dahi et al. | |
| 2005/0062933 A1 | 3/2005 | Perel et al. | |
| 2007/0052876 A1 | 3/2007 | Kaufman et al. | |
| 2009/0091818 A1 | 4/2009 | Haddock et al. | |
| 2009/0213326 A1 | 8/2009 | Zhao | |
| 2009/0244477 A1 | 10/2009 | Pugh et al. | |
| 2011/0149236 A1 | 6/2011 | Weeber | |
| 2011/0157544 A1 | 6/2011 | Pugh et al. | |
| 2012/0120365 A1 | 5/2012 | Legerton et al. | |
| 2012/0140167 A1 | 6/2012 | Blum | |
| 2012/0234453 A1 | 9/2012 | Pugh et al. | |

FOREIGN PATENT DOCUMENTS

| | | |
|---|---|---|
| JP | 11174388 A | 7/1999 |
| JP | 2009008848 A | 1/2009 |
| WO | WO1984003569 A1 | 9/1984 |
| WO | WO1993023774 A1 | 5/1993 |
| WO | 1997010527 A1 | 3/1997 |
| WO | 2004010204 A1 | 1/2004 |
| WO | 2004015460 A2 | 2/2004 |
| WO | 2004068196 | 8/2004 |
| WO | WO2007149773 A2 | 12/2007 |
| WO | WO2012149056 | 11/2012 |

OTHER PUBLICATIONS

Singapore Search Report 10201400552X Date of submission of the request to the Intellectual Property Office of Singapore: Sep. 24, 2014: Date of actual completion of the search: Jan. 28, 2015: Date Johnson & Johnson Received report from Singapore: 2015.

\* cited by examiner

METHOD AND APPARATUS FOR ENCAPSULATING A RIGID INSERT IN A CONTACT LENS FOR CORRECTING VISION IN ASTIGMATIC PATIENTS

CROSS-REFERENCE TO RELATED APPLICATION

This application is a continuation of, and claims priority to, U.S. patent application Ser. No. 14/612,029, filed Feb. 2, 2015, which is a continuation of, and claims priority to U.S. patent application Ser. No. 13/833,967, filed Mar. 15, 2013, now U.S. Pat. No. 8,974,055, the entire contents of which are hereby incorporated by reference.

FIELD OF USE

This invention describes methods, apparatus, and devices related to encapsulation aspects related to Ophthalmic Devices and, more specifically, in some embodiments, the sealing and encapsulation aspects in the fabrication of a contact lens for astigmatism.

BACKGROUND

Traditionally, an Ophthalmic Device, such as a Contact Lens or an intraocular Lens, included a biocompatible device with a corrective, cosmetic, or therapeutic quality. A Contact Lens, for example, can provide one or more of vision-correcting functionality, cosmetic enhancement, and therapeutic effects. The physical characteristics of the Ophthalmic Lens provide each function. A design incorporating a refractive quality into an Ophthalmic Lens can provide a vision-corrective function. A pigment incorporated into the Ophthalmic Lens can provide a cosmetic enhancement. An active agent incorporated into an Ophthalmic Lens can provide a therapeutic functionality.

Astigmatism is a common optical defect that is often the result of irregular or toric curvature of the cornea or lens of the eye. As a result, correcting vision for patients with astigmatism requires a more complex solution than the typical Contact Lens. More recently, it is desirable therefore to have additional methods and apparatus conducive to the formation of Ophthalmic Lenses that may correct vision in astigmatic patients. Recently, Rigid Inserts have been included in Ophthalmic Lenses, wherein the Rigid Insert may add functionality to the Ophthalmic Lens. Novel methods, devices, and apparatus relating to the sealing and encapsulation of a Rigid Insert within an Ophthalmic Lens are therefore important.

SUMMARY

Accordingly, the present invention includes innovations relating to an Ophthalmic Lens device with a Rigid Insert capable of masking astigmatism, the Ophthalmic Lens device comprising a lens comprising a biocompatible material, wherein the biocompatible material allows for placement of the Ophthalmic Lens on an eye; a Rigid Insert, wherein the lens encapsulates the Rigid Insert; and a feature capable of correcting astigmatic vision, wherein the feature is located on one or both of the lens and the Rigid Insert. In some embodiments, the biocompatible material may comprise a polymerized Reactive Monomer Mixture, including, for example, a hydrogel.

The Rigid Insert may include a plurality of zones, wherein each zone mirrors an astigmatic characteristic of the eye. In some embodiments, each zone may comprise a different material, wherein each material enhances the effectiveness of the zone. The Rigid Insert may include a three-dimensional topography, for example, through a thermoforming process. The three-dimensional topography may mirror the astigmatic characteristic of the eye. The three-dimensional topography of the Rigid Insert may be enhanced by a three-dimensional topography of the lens.

The Ophthalmic Lens may further comprise a Stabilizing Feature capable of orienting the Ophthalmic Lens on the eye, wherein the orientation is capable of aligning the plurality of zones with the astigmatic characteristics of the eye. The Stabilizing Feature may be separate from the Rigid Insert or may be included in the Rigid Insert, for example, through a thermoforming process. In some embodiments, the Stabilizing Feature may alter a front curve surface of the Ophthalmic Lens. In others, the Stabilizing Feature may add mass to the Ophthalmic Lens, wherein the mass is sufficient to ballast the Ophthalmic Lens. The Stabilizing Feature may further comprise a visual orientation cue, wherein the visual orientation cue is visible to the user and allows the user to see how the Ophthalmic Lens should be oriented prior to placement on the eye.

In some embodiments, the Ophthalmic Lens may provide multiple functionalities, in addition to correcting astigmatism. For example, the lens may further comprise a polarizing function or a cosmetic function, such as a patterned coloration. In some embodiment, the Rigid Insert may further comprise an active agent, wherein the active agent is capable of dissolving into an ophthalmic environment on the eye.

DESCRIPTION OF THE DRAWINGS

FIG. 1 illustrates exemplary Mold assembly apparatus components that may be useful in implementing some embodiments of the present invention.

DETAILED DESCRIPTION OF THE INVENTION

Figure 1:
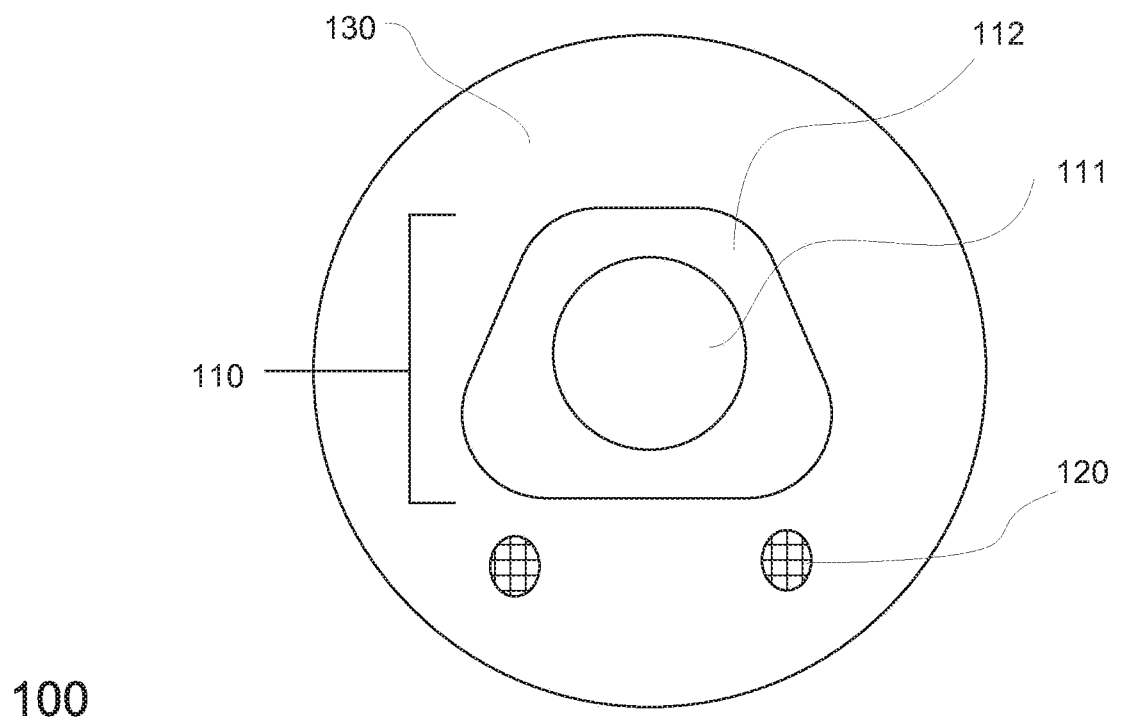
FIG. 1 illustrates an exemplary embodiment of an Ophthalmic Lens with a fully encapsulated Rigid Insert, wherein the Ophthalmic Lens may correct vision in astigmatic patients.
Figure 1:
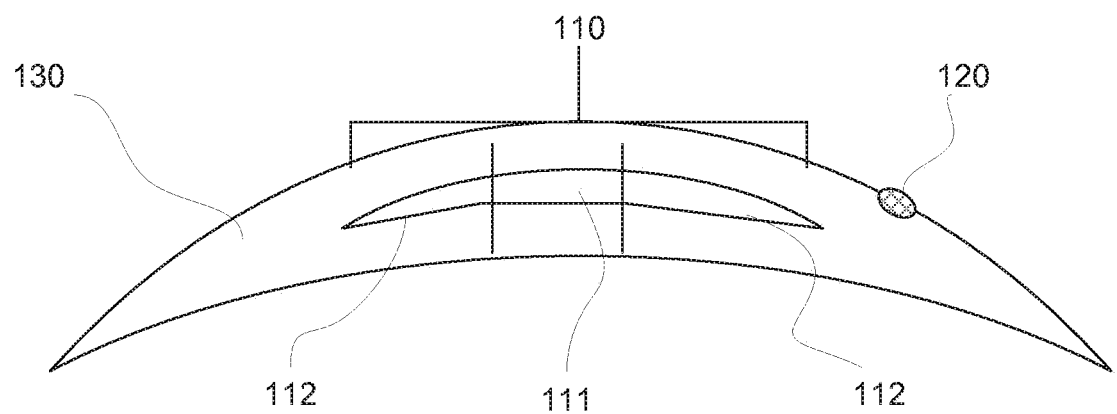

The present invention includes methods and apparatus for manufacturing an Ophthalmic Lens with a Rigid Insert, wherein the Rigid Insert corrects vision in astigmatic patients. In addition, the present invention includes the resulting Ophthalmic Lens with the Rigid Insert. In general, according to some embodiments of the present invention, a Rigid Insert may be integrated into an Ophthalmic Lens via automation that places a Rigid Insert in a desired location relative to a Mold part used to fashion the Ophthalmic Lens.

Currently, Ophthalmic Lenses exist to correct astigmatism. For example, rigid gas permeable lenses may be placed over the cornea, and a tear layer will form between the lens and the eye. The rigid gas permeable lens essentially acts as the new cornea, which may be designed to mimic the curvature of a nonastigmatic eye. This technique is considered masking. However, the typical rigid gas permeable lens is uncomfortable and expensive.

Soft contact lenses provide a more comfortable and less expensive alternative. Unlike with an RGP, a tear layer may not form between the eye and the lens; so, a soft contact lens may be tailored to mirror the astigmatic characteristics of the eye. The lens may contain varied powers and angles of refraction to correct each portion of the eye. However, because the lens is soft, the lens naturally conforms, to some extent, to shape of the eye. This reduces the effectiveness of the lens, and users often complain of blurriness or double vision.

The issues with comfort and effectiveness of either solution are exacerbated in patients with severe astigmatism. Accordingly, the present invention provides a novel alternative to correcting vision in astigmatic patients. An Ophthalmic Lens that may include a Rigid Insert is described, and more specifically, where an encapsulated Rigid Insert may provide the correction to astigmatism.

In the following sections, detailed descriptions of embodiments of the invention will be given. The description of both preferred and alternative embodiments are exemplary embodiments only, and it is understood that to those skilled in the art that variations, modifications, and alterations may be apparent. It is therefore to be understood that said exemplary embodiments do not limit the scope of the underlying invention.

Glossary

In this description and claims directed to the presented invention, various terms may be used for which the following definitions will apply:

Adhesion Promotion: as used herein refers to a process that increases the adhesive tendencies between two surfaces, such as, for example, between a Rigid Insert and an encapsulant.

Back Curve Piece or Back Insert Piece: as used herein refers to a solid element of a Multi-piece Rigid Insert that, when assembled into the said insert, will occupy a location on the side of the Ophthalmic Lens that is on the back. In an Ophthalmic Device, such a piece would be located on the side of the insert that would be closer to the wearer's eye surface. In some embodiments, the Back Curve Piece may contain and include a region in the center of an Ophthalmic Device through which light may proceed into the wearer's eye. This region may be called an Optical Zone. In other embodiments, the piece may take an annular shape where it does not contain or include some or all of the regions in an Optical Zone. In some embodiments of an ophthalmic insert, there may be multiple Back Curve Pieces, and one of them may include the Optical Zone, while others may be annular or portions of an annulus.

Component: as used herein refers to a device capable of drawing electrical current from an Energy Source to perform one or more of a change of logical state or physical state.

Encapsulate: as used herein refers to creating a barrier to separate an entity, such as, for example, a Media Insert, from an environment adjacent to the entity.

Encapsulant: as used herein refers to a layer formed surrounding an entity, such as, for example, a Media Insert, that creates a barrier to separate the entity from an environment adjacent to the entity. For example, Encapsulants may be comprised of silicone hydrogels, such as Etafilcon, Galyfilcon, Narafilcon, and Senofilcon, or other hydrogel contact lens material. In some embodiments, an Encapsulant may be semipermeable to contain specified substances within the entity and preventing specified substances, such as, for example, water, from entering the entity.

Energized: as used herein refers to the state of being able to supply electrical current to or to have electrical Energy stored within.

Energy: as used herein refers to the capacity of a physical system to do work. Many uses within this invention may relate to the said capacity being able to perform electrical actions in doing work.

Energy Source: as used herein refers to a device capable of supplying Energy or placing a biomedical device in an Energized state.

Energy Harvesters: as used herein refers to device capable of extracting Energy from the environment and convert it to electrical Energy.

Front Curve Piece or Front Insert Piece: as used herein refers to a solid element of a Multi-piece Rigid Insert that, when assembled into the said insert, will occupy a location on the side of the Ophthalmic Lens that is on the front. In an Ophthalmic Device, such a piece would be located on the side of the insert that would be further from the wearer's eye surface. In some embodiments, the piece may contain and include a region in the center of an Ophthalmic Device through which light may proceed into the wearer's eye. This region may be called an Optical Zone. In other embodiments, the piece may take an annular shape where it does not contain or include some or all of the regions in an Optical Zone. In some embodiments of an ophthalmic insert, there may be multiple Front Curve Pieces, and one of them may include the Optical Zone, while others may be annular or portions of an annulus.

Lens-Forming Mixture or Reactive Mixture or Reactive Monomer Mixture (RMM): as used herein refers to a monomer or prepolymer material that can be cured and crosslinked or crosslinked to form an Ophthalmic Lens. Various embodiments may include Lens-Forming Mixtures with one or more additives such as, for example, UV blockers, tints, photoinitiators or catalysts, and other additives useful in Ophthalmic Lenses such as Contact or intraocular Lenses.

Lens-Forming Surface: as used herein refers to a surface that is used to mold an Ophthalmic Lens. In some embodiments, any such surface can have an optical quality surface finish, which indicates that it is sufficiently smooth and formed so that an Ophthalmic Lens surface fashioned by the polymerization of a Lens-Forming Mixture in contact with the molding surface is optically acceptable. Further, in some embodiments, the Lens-Forming Surface can have a geometry that is necessary to impart to the Ophthalmic Lens surface the desired optical characteristics, including without limitation, spherical, aspherical and cylinder power, wave front aberration correction, corneal topography correction, or combinations thereof.

Lithium Ion Cell: as used herein refers to an electrochemical cell where lithium ions move through the cell to generate electrical Energy. This electrochemical cell, typically called a battery, may be Reenergized or recharged in its typical forms.

Media Insert: as used herein refers to an encapsulated insert that will be included in an energized Ophthalmic Device. The energization elements and circuitry may be embedded in the Media Insert. The Media Insert defines the primary purpose of the energized Ophthalmic Device. For example, in embodiments where the energized Ophthalmic Device allows the user to adjust the optic power, the Media Insert may include energization elements that control a liquid meniscus portion in the Optical Zone. Alternatively, a Media Insert may be annular so that the Optical Zone is void of material. In such embodiments, the energized function of the Lens may not be optic quality but may be, for example, monitoring glucose or administering medicine.

Mold: as used herein refers to a rigid or semi-rigid object that may be used to form Ophthalmic Lenses from uncured formulations. Some preferred Molds include two Mold parts forming a front curve Mold and a back curve Mold.

Ophthalmic Lens or Ophthalmic Device or Lens: as used herein refers to any device that resides in or on the eye. The device may provide optical correction, may be cosmetic, or provide some functionality unrelated to optic quality. For example, the term Lens may refer to a contact Lens, intraocular Lens, overlay Lens, ocular insert, optical insert, or other similar device through which vision is corrected or modified, or through which eye physiology is cosmetically enhanced (e.g. iris color) without impeding vision. Alternatively, Lens may refer to a device that may be placed on the eye with a function other than vision correction, such as, for example, monitoring of a constituent of tear fluid or means of administering an active agent. In some embodiments, the preferred Lenses of the invention may be soft contact Lenses that are made from silicone elastomers or hydrogels, which may include, for example, silicone hydrogels and fluorohydrogels.

Optic Zone: as used herein refers to an area of an Ophthalmic Lens through which a wearer of the Ophthalmic Lens sees.

Power: as used herein refers to work done or energy transferred per unit of time.

Precure: as used herein refers to a process that partially cures a mixture. In some embodiments, a precuring process may comprise a shortened period of the full curing process. Alternatively, the precuring process may comprise a unique process, for example, by exposing the mixture to different temperatures and wavelengths of light than may be used to fully cure the material.

Predose: as used herein refers to the initial deposition of material in a quantity that is less than the full amount that may be necessary for the completion of the process. For example, a predose may include a quarter of the necessary substance.

Postdose: as used herein refers to a deposition of material in the remaining quantity, after the predose, that may be necessary for the completion of the process. For example, where the predose includes a quarter of the necessary substance, a subsequent postdose may provide the remaining three quarters of the substance.

Rechargeable or Reenergizable: as used herein refers to a capability of being restored to a state with higher capacity to do work. Many uses within this invention may relate to the capability of being restored to a state with the ability to flow electrical current at a certain rate for a certain, reestablished time period.

Recharge or Reenergize: as used herein refers to an act of restoring to a state with higher capacity to do work. Many uses within this invention may relate to restoring a device to a state with the capability to flow electrical current at a certain rate for a certain, reestablished time period.

Released from a Mold: as used herein refers to an act where an Ophthalmic Lens is either completely separated from the Mold or is only loosely attached so that it can be removed with mild agitation or pushed off with a swab.

Rigid Insert: as used herein refers to an insert that maintains a predefined topography. When included in a Contact Lens, the Rigid Insert may contribute to the functionality and/or modulus of the Lens. For example, varying topography of or densities within the Rigid Insert may define zones, which may correct vision in users with astigmatism. The Rigid Insert may be flexible, for example the Rigid Insert may flex during insertion and/or removal of the lens.

Stabilizing Feature: as used herein refers to a physical characteristic that stabilizes an Ophthalmic Device to a specific orientation on the eye, when the Ophthalmic Device is placed on the eye. In some embodiments, the Stabilizing Feature may add sufficient mass to ballast the Ophthalmic Device. In some embodiments, the Stabilizing Feature may alter the front curve surface, wherein the eyelid may catch the Stabilizing Feature and the user may reorient the Lens by blinking. Such embodiments may be enhanced by including Stabilizing Features that may add mass. In some exemplary embodiments, Stabilizing Features may be a separate material from the encapsulating biocompatible material, may be an insert formed separately from the molding process, or may be included in the Rigid Insert or Media Insert.

Stacked Integrated Component Devices (SIC-Devices): as used herein refers to the product of packaging technologies that can assemble thin layers of substrates, which may contain electrical and electromechanical devices, into operative integrated devices by means of stacking at least a portion of each layer upon each other. The layers may comprise Component devices of various types, materials, shapes, and sizes. Furthermore, the layers may be made of various device-production technologies to fit and assume various contours.

Swellable Index: as used herein refers to the expandability or expanding tendency of a specific material during the manufacturing of an Ophthalmic Lens.

Ophthalmic Lenses

Proceeding to FIG. 1, an exemplary embodiment Ophthalmic Lens 100 with a Rigid Insert 110, wherein the Rigid Insert 110 includes physical attributes that correct vision for patients with astigmatism, is illustrated. In some embodiments, a Rigid Insert 110 may mirror the astigmatic characteristics of the eye. For example, the Rigid Insert 110 may include a first zone 111 with a first power and angle of refraction and a second zone 112 with a second power and angle of refraction. In some embodiments, the first zone 111 may not be located exactly in the center of the eye, and the second zone 112 may not be radially symmetrical.

In such embodiments, Stabilizing Features 120 may be necessary to properly orient the Ophthalmic Lens 100 on the eye. The Stabilizing Features 120 may comprise a material that is different from the encapsulating Reactive Monomer Mixture. In some embodiments, the material for the Stabilizing Features 120 may be placed on a Front Curve Mold Piece prior to placement of the Rigid Insert 110. Alternatively, the material may be injected into the Ophthalmic Lens 100 after the Rigid Insert 110 has been placed between the Front Curve Mold Piece and the Back Curve Mold Piece.

As shown in cross section, the Stabilizing Feature 120 may orient the Ophthalmic Lens 100 on the eye by adding sufficient mass to anchor the Ophthalmic Lens 100 to prevent rotation on the eye. In some alternative embodiments, the Stabilizing Feature 110 may comprise a material with a different swellable index than the encapsulating RMM. In such embodiments, the Stabilizing Feature 110 may swell during the process of forming the Ophthalmic Lens 100, wherein the swelling allows the Stabilizing Feature 110 to alter the front surface topography of the Ophthalmic Lens 100. When placed on the eye, the eyelid may catch the Stabilizing Feature 110, and the user may reorient the lens by blinking. To further facilitate placement on the eye, the Stabilizing Feature 110 may contain a tint, wherein the user may see how the Ophthalmic Lens 100 may orient on the eye prior to placement.

In some embodiments a Rigid Insert may be formed by thermoforming an aligned and held sheet into a three-dimensional shape that may replicates the surface of a thermoforming mold piece. The resulting piece may be cut from the thin sheet of material. By positioning the Rigid Insert within a cavity defined by front and back curve mold pieces and surrounding the insert with Reactive Monomer Mixture an Ophthalmic Lens may be formed. During the process of cutting out insert pieces from thermoforming material, alignment features may be cut into the insert piece such as notches, grooves, or flats for example. These features may be used to align the insert piece or formed ophthalmic insert devices in subsequent processing.

Figure 2:
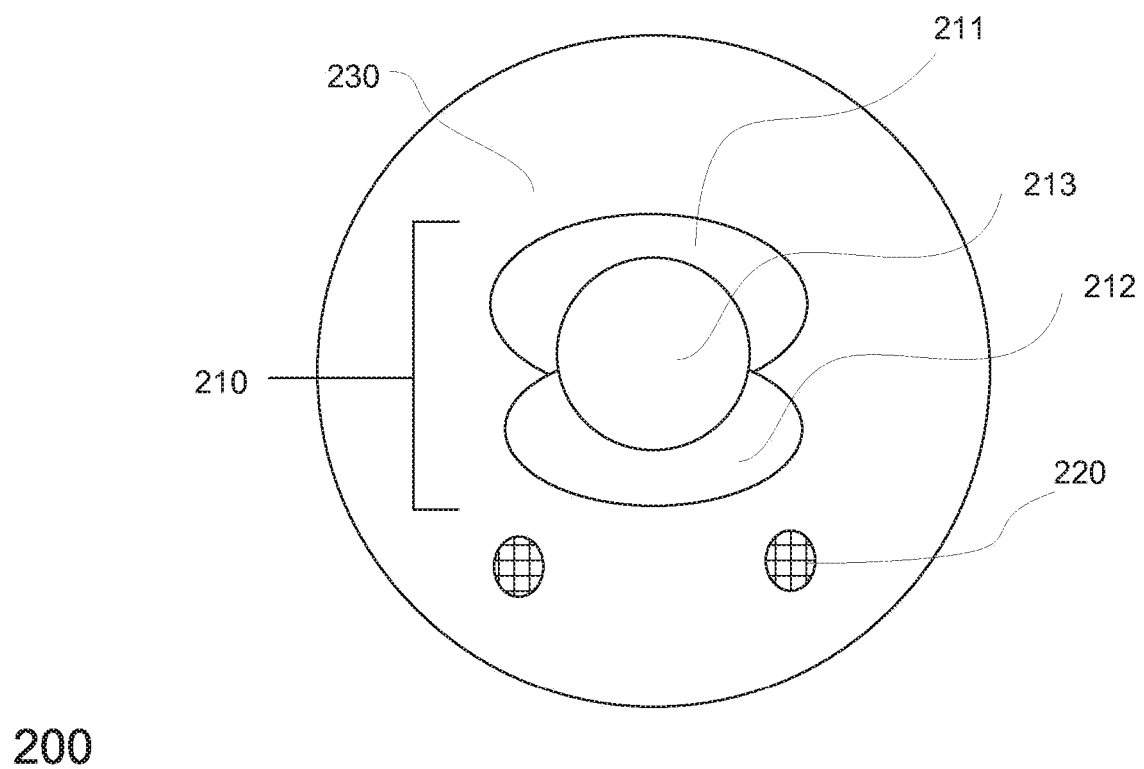
FIG. 2 illustrates an alternate
Figure 2:
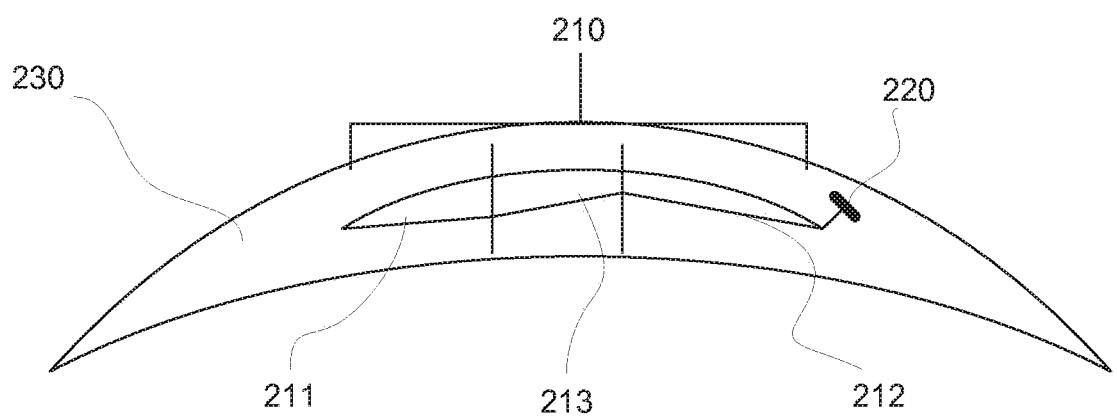

Proceeding to FIG. 2, an alternative embodiment of an Ophthalmic Lens 200 with a Rigid Insert 210, wherein the Rigid Insert 210 includes physical attributes to correct vision in astigmatic patients, is illustrated. In patients with severe astigmatism, the Rigid Insert 210 may include a complex configuration of zones 211-213, wherein each zone 211-213 corrects vision for a specific portion of the eye. The Rigid Insert 210 may be fully encapsulated in the Ophthalmic Lens 200 and may not have direct contact with the eye. Accordingly, in some embodiments, the Rigid Insert 210 may comprise a variety of material, wherein the materials may not be biocompatible. For example, a first zone 211 may include a different material from a second 212 or third 213 zone. The properties of each material may increase the effectiveness of vision correction for each zone 211-213 or the properties alone may be sufficient to correct the astigmatic characteristics. The properties may include, for example, density or refractive index.

In some embodiments, the Rigid Insert 210 may be formed through a thermoforming process. For example, in embodiments where each zone 211-213 comprises a unique material, a thin sheet may be regionally coated with each material. The thin sheet or a Rigid Insert cut from the thin sheet may be thermoformed to include a Three-dimensional Surface, wherein the topography of Three-dimensional Surface of the Rigid Insert contributes to the correction of the astigmatic characteristics of the eye. In some embodiments, the Three-dimensional Surface may be sufficient to create the necessary zones 211-213.

In some embodiments of Ophthalmic Lenses 200 that include Rigid Inserts 210 with multiple zones, and particularly where the Rigid Insert 210 includes complex variation, Stabilizing Features 220 may be included with the Rigid Insert 210. This may allow for precise alignment between the Stabilizing Features 220 and the Rigid Insert 210. In some specific embodiments where the Rigid Insert 210 may be thermoformed, the Rigid Insert may be cut from the thin sheet to include the Stabilizing Features 220, as shown in cross section where the Stabilizing Feature 220 extends from the Rigid Insert 220.

Similar to FIG. 1, the Stabilizing Feature 220 may alter the front surface topography so the user may reorient the Ophthalmic Lens 200 by blinking, or, in some embodiments, the Stabilizing Feature 220 may add sufficient mass to orient the Ophthalmic Lens 200 on the eye. Some other embodiments may include a combination of mass and altered front surface topography. The Stabilizing Features 220 may include further characteristics that may assist the user in properly orienting the Ophthalmic Lens 200. For example, the Stabilizing Feature 220 may include an inscription or tinting to indicate to the user how the Ophthalmic Lens 200 may be placed on the eye.

In some embodiments, other passive elements may be included with the Rigid Insert 210. In some embodiments, the Rigid Insert 210 may include polarizing elements that may reduce glare, which may increase vision sharpness. In some embodiments, the Rigid Insert 210 may include a printed pattern that may add cosmetic functionality, including a concealment of the zones 211-213 on the Rigid Insert 210. In some embodiments, the Rigid Insert 210 may include an active agent that may dissolve when the Ophthalmic Lens 200 is placed on the eye. Embodiments where the active agent is a medicament may be particularly significant where the astigmatism is caused by damage to the eye.

Figure 3:
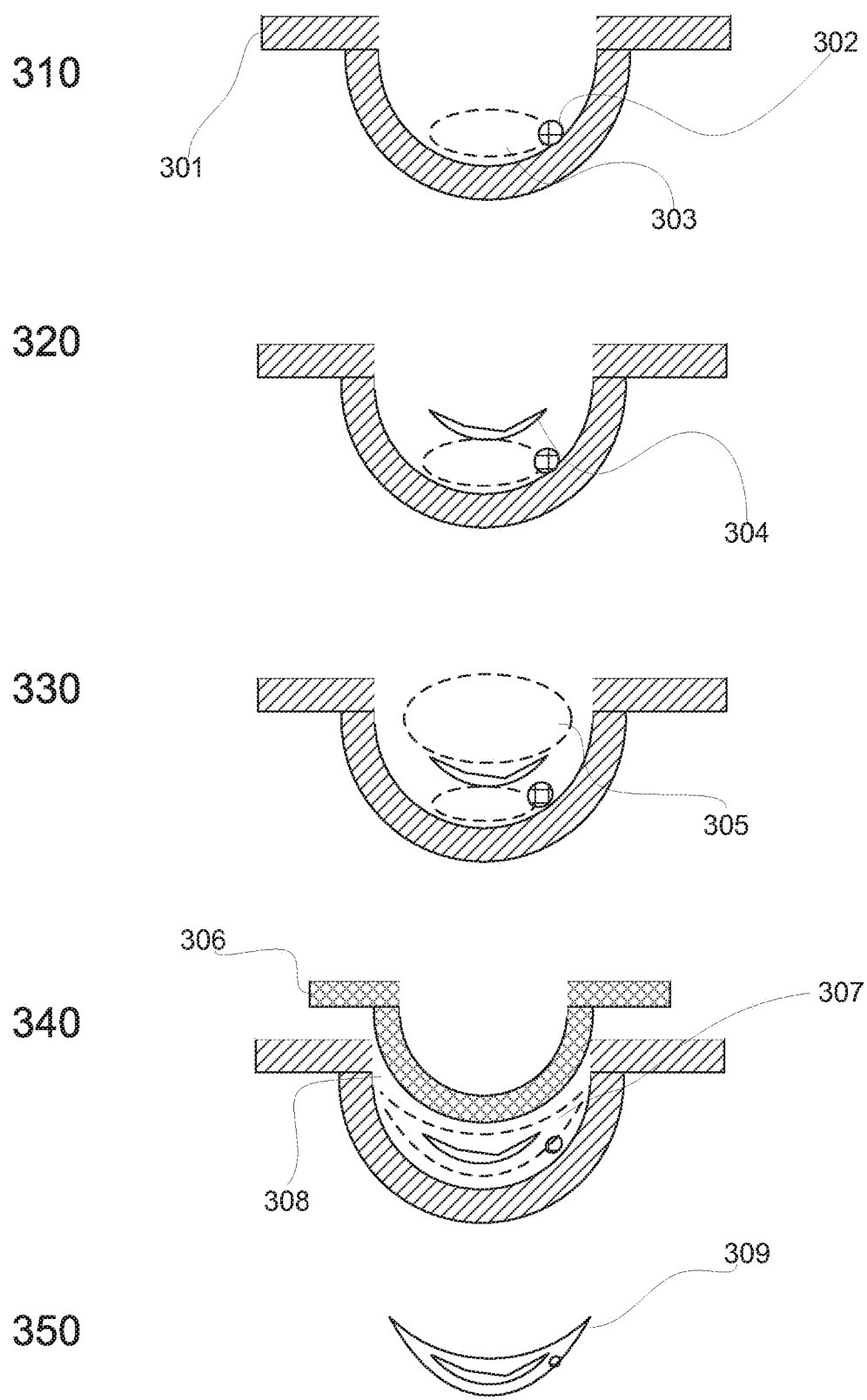
FIG. 3 illustrates exemplary Mold assembly apparatus components that may be useful in implementing some embodiments of the present invention.

Proceeding to FIG. 3, exemplary processing steps for forming an Ophthalmic Lens 309 with a Rigid Insert 304, wherein the Rigid Insert 304 is encapsulated and may be capable of correcting astigmatic vision, are illustrated. Exemplary materials and curing specifications are included in Table 1, but other materials and polymerization techniques may be apparent and are within the scope of the described inventive art. At 310, a front curve Mold 301 may be predosed with Reactive Monomer Mixture 303. In some embodiments, Stabilizing Features 302 may be deposited on the front curve Mold 301 or on the predosed RMM 303.

At 320, a Rigid Insert 304 may be placed proximate to the front curve Mold 304 and in contact with the predosed RMM, wherein the placement forms a front curve assembly 301-304. In embodiments where the Stabilizing Feature 302 is separate from the Rigid Insert 304, the Rigid Insert 304 may be aligned with the Stabilizing Feature 302 and placed to allow proper orientation of the Ophthalmic Lens 309 when the Ophthalmic Lens 309 is placed on an eye.

At 330, the front curve assembly 301-304 may be post-dosed with Reactive Monomer Mixture 305, wherein the predose amount 303 and the postdose amount 305 may fully encapsulate the Rigid Insert 304 and properly form an Ophthalmic Lens 308. At 340, a back curve Mold 306 may be placed proximate to the front curve Mold 301, wherein the front curve Mold 301 and the back curve Mold 306 may form a lens-forming cavity 308. The lens-forming cavity 308 may combine the postdosed RMM 305 and predosed RMM 303, which may allow the RMM 307 to fully encapsulate the Rigid Insert 304.

In some embodiments, the RMM 307 may adhere to or at least partially encapsulate the Stabilizing Features 303. The front curve and back curve assembly 301-307 may be polymerized, for example through a curing process, to form the Ophthalmic Lens 309. At 350, the Ophthalmic Lens 309 may be removed from the molding apparatus 301, 306.

TABLE 1

Partial Listing of exemplary sealing materials, encapsulating materials and coating materials

| Material | Exemplary aspects of utility |
| --- | --- |
| Epoxy Systems | One Component - high temp cure, excellent adhesive, biocompatible |
| | Two Component - fast cure at ambient, biocompatibility, gap filling |
| Silicone Systems | One Component - resistance to humidity, high flexibility, Insulation, Optical Clarity |
| | Two Component - Strength, Superior Flexibility, biocompatibility |
| UV Curable Systems | Fast Cure, grades with Flexibility, vapor free |
| LED Curable Systems | One Component, Low Temperature applications |

TABLE 1-continued

Partial Listing of exemplary sealing materials, encapsulating materials and coating materials

| Material | Exemplary aspects of utility |
| --- | --- |
| Polyurethanes | Optical Clarity, Insulation, Flexibility |
| Polysulfides | Underwater cure, high Strength, high chem resistance |
| Cyanoacrylates | Biocompatibility, single compound, no outgassing |
| Elastomeric Systems | Excellent water resistance, Insulation, single compound |
| Film Adhesives | Preform-ability, excellent insulation characteristics |
| Hot Melt Systems | Food Contact Grades |
| Latex Systems | Pressure Sensitive Applications, Food Contact Grades |
| Polyimides | Photosensitive, Preform-ability, Flexibility |
| Parylenes (Vapor Phase Film Dep) | Surface Treatment, Insulation, Conformal Application |

Elements may be formed from materials that may or may not be stable in the environments that Ophthalmic Devices occupy, including, for example, the tear fluid on an ocular surface that contacts the element. The use may include forming encapsulation layers from coatings, including, for example, a parylene family including, but not limited to, the parylene C, N, and D family elements. In some embodiments, the encapsulation coating may occur before or after application of other adhesive or sealant layers.

Methods and Materials for Insert Based Ophthalmic Lenses

Referring back to FIG. 3, exemplary processing steps for forming an Ophthalmic Lens 309 with a Rigid Insert 304, wherein the Rigid Insert 304 is encapsulated and may be capable of correcting astigmatic vision, are illustrated. As used herein, a Mold apparatus 301, 306 may include a plastic formed to shape a lens-forming cavity 308 into which a Lens-Forming Mixture 307 may be dispensed, and, upon reaction or cure of the Lens-Forming Mixture 307, an Ophthalmic Lens 309 of a desired shape is produced. The combination of Mold parts 301, 306 is preferably temporary, wherein, upon formation of the Ophthalmic Lens 309, the Mold parts 301, 306 may be separated for removal, at 350, of the Ophthalmic Lens 309.

At least one Mold part 301, 306 may have at least a portion of its surface in contact with the Lens-Forming Mixture 307 so that upon reaction or cure of the Lens-Forming Mixture 307 the surface provides a desired shape and form to the portion of the Ophthalmic Lens with which it is in contact. The same is true of at least one other Mold part 301, 306.

Thus, for example, in an exemplary embodiment a Mold apparatus 301, 306 is formed from two parts 301, 306, a female concave piece (front curve Mold) 301 and a male convex piece (back curve Mold) 306 with a cavity 308 formed between them. The portion of the concave surface that makes contact with a Lens-Forming Mixture 307 has the curvature of the front curve of an Ophthalmic Lens 309.

Said portion is sufficiently smooth and formed such that the surface of an Ophthalmic Lens 309, formed by polymerization of the Lens-Forming Mixture 307 that is in contact with the concave surface, is optically acceptable. In some embodiments, the front curve Mold 301 may also have an annular flange integral to and surrounding a circular circumferential edge that extends from the front curve Mold 301 in a plane normal to the axis and also extends from the flange (not shown).

A Lens-Forming Surface can include a surface with an optical-quality surface finish, which indicates that it is sufficiently smooth and formed so that an Ophthalmic Lens surface fashioned by the polymerization of a Lens-Forming Mixture 308 in contact with the molding surface is optically acceptable. Further, in some embodiments, the Lens-Forming Surfaces of the Mold pieces 301, 306 may have a geometry that is necessary to impart to the Ophthalmic Lens surface the desired optical characteristics, including, but not limited to, spherical, aspherical, and cylinder power; wave front aberration correction; corneal topography correction; and combinations thereof. One ordinarily skilled in the art will recognize that characteristics other than those discussed may also be included within the scope of the invention.

Some additional embodiments include a Rigid Insert 304 that may be fully encapsulated within a hydrogel matrix. A Rigid Insert 304 may be manufactured, for example, using microinjection molding technology. Embodiments can include, for example, a poly(4-methylpent-1-ene) copolymer resin with a diameter of between about 6 mm to 10 mm and a front surface radius of between about 6 mm and 10 mm and a rear surface radius of between about 6 mm and 10 mm and a center thickness of between about 0.050 mm and 0.5 mm. Some exemplary embodiments include an insert with diameter of about 8.9 mm and a front surface radius of about 7.9 mm and a rear surface radius of about 7.8 mm and a center thickness of about 0.100 mm and an edge profile of about 0.050 radius. One exemplary micromolding machine can include the Microsystem 50 five-ton system offered by Battenfield Inc. Some or all of the sealing features, including, but not limited to, grooves, slots, lips, and knife edges may be formed during the molding process or formed later by subsequent processing of the result of the molding process.

The Rigid Insert 304 may be placed in a Mold part 301, 306 utilized to form an Ophthalmic Lens 308. Mold part 301, 306 material can include, for example, a polyolefin of one or more of the following: polypropylene, polystyrene, polyethylene, polymethyl methacrylate, and modified polyolefins. Other Molds can include a ceramic or metallic material.

Other Mold materials that may be combined with one or more additives to form an Ophthalmic Lens Mold include, for example, Zieglar-Natta polypropylene resins (sometimes referred to as znPP); a clarified random copolymer for clean molding as per FDA regulation 21 CFR (c) 3.2; a random copolymer (znPP) with ethylene group.

Still further, in some embodiments, the Molds of the invention may contain polymers such as polypropylene, polyethylene, polystyrene, polymethyl methacrylate, modified polyolefins containing an alicyclic moiety in the main chain, and cyclic polyolefins. This blend can be used on either or both Mold halves. Preferably, this blend is used on the back curve, and the front curve consists of the alicyclic co-polymers.

In some embodiments, an Ophthalmic Lens type may include an Ophthalmic Lens that includes a silicone-containing Component. A silicone-containing Component is one that contains at least one [—Si—O—] unit in a monomer, macromer, or prepolymer. Preferably, the total silicone and attached oxygen are present in the silicone-containing Component in an amount greater than about 20 weight percent, and more preferably greater than 30 weight percent of the total molecular weight of the silicone-containing Component. Useful silicone-containing Components preferably comprise polymerizable functional groups such as acrylate, methacrylate, acrylamide, methacrylamide, vinyl, N-vinyl lactam, N-vinylamide, and styryl functional groups.

In some embodiments, the Ophthalmic Lens skirt, also called an insert encapsulating layer, that surrounds the insert may be comprised of standard hydrogel Ophthalmic Lens formulations. Exemplary materials with characteristics that may provide an acceptable match to numerous insert materials may include, but are not limited to, the Narafilcon family (including Narafilcon A and Narafilcon B), and the Etafilcon family (including Etafilcon A). A more technically inclusive discussion follows on the nature of materials consistent with the art herein. One ordinarily skilled in the art may recognize that other material other than those discussed may also form an acceptable enclosure or partial enclosure of the sealed and encapsulated inserts and should be considered consistent and included within the scope of the claims.

Suitable silicone-containing Components include compounds of Formula I

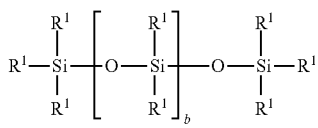

wherein $R^1$ is independently selected from monovalent reactive groups, monovalent alkyl groups, or monovalent aryl groups, any of which may further comprise functionality selected from hydroxy, amino, oxa, carboxy, alkyl carboxy, alkoxy, amido, carbamate, carbonate, halogen or combinations thereof; monovalent siloxane chains comprising 1-100 Si—O repeat units that may further comprise functionality selected from alkyl, hydroxy, amino, oxa, carboxy, alkyl carboxy, alkoxy, amido, carbamate, halogen, or combinations thereof;

where b is 0 to 500, where it is understood that when b is other than 0, b is a distribution having a mode equal to a stated value;

wherein at least one $R^1$ comprises a monovalent reactive group and, in some embodiments, between one and three $R^1$ comprise monovalent reactive groups.

As used herein, monovalent reactive groups are groups that can undergo free radical and/or cationic polymerization. Non-limiting examples of free radical reactive groups include (meth)acrylates, styryls, vinyls, vinyl ethers, $C_{1-6}$alkyl(meth)acrylates, (meth)acrylamides, $C_{1-6}$alkyl(meth)acrylamides, N-vinyllactams, N-vinylamides, $C_{2-12}$alkenyls, $C_{2-12}$alkenylphenyls, $C_{2-12}$alkenylnaphthyls, $C_{2-6}$alkenylphenyl$C_{1-6}$alkyls, O-vinylcarbamates, and O-vinylcarbonates. Non-limiting examples of cationic reactive groups include vinyl ethers or epoxide groups and mixtures thereof. In one embodiment the free radical reactive groups comprise (meth)acrylate, acryloxy, (meth)acrylamide, and mixtures thereof.

Suitable monovalent alkyl and aryl groups include unsubstituted monovalent $C_{1-16}$alkyl groups, $C_{6-14}$ aryl groups, such as substituted and unsubstituted methyl, ethyl, propyl, butyl, 2-hydroxypropyl, propoxypropyl, polyethyleneoxypropyl, combinations thereof, and the like.

In one embodiment b is 0, one $R^1$ is a monovalent reactive group, and at least three $R^1$ are selected from monovalent alkyl groups having 1 to 16 carbon atoms or, in another embodiment, from monovalent alkyl groups having 1 to 6 carbon atoms. Non-limiting examples of silicone Components of this embodiment include 2-methyl-,2-hydroxy-3-[3-[1,3,3,3-tetramethyl-1-[(trimethylsilyl)oxy]disiloxanyl] propoxy]propyl ester ("SiGMA"), 2-hydroxy-3-methacryloxypropyloxypropyl-tris(trimethylsiloxy)silane, 3-methacryloxypropyltris(trimethylsiloxy)silane ("TRIS"), 3-methacryloxypropylbis(trimethylsiloxy)methylsilane, and 3-methacryloxypropylpentamethyl disiloxane.

In another embodiment, b is 2 to 20, 3 to 15 or, in some embodiments, 3 to 10; at least one terminal $R^1$ comprises a monovalent reactive group and the remaining $R^1$ are selected from monovalent alkyl groups having 1 to 16 carbon atoms or, in another embodiment, from monovalent alkyl groups having 1 to 6 carbon atoms. In yet another embodiment, b is 3 to 15, one terminal $R^1$ comprises a monovalent reactive group, the other terminal $R^1$ comprises a monovalent alkyl group having 1 to 6 carbon atoms, and the remaining $R^1$ comprise monovalent alkyl group having 1 to 3 carbon atoms. Non-limiting examples of silicone Components of this embodiment include (mono-(2-hydroxy-3-methacryloxypropyl)-propyl ether terminated polydimethylsiloxane (400-1000 MW)) ("OH-mPDMS"), and monomethacryloxypropyl terminated mono-n-butyl terminated polydimethylsiloxanes (800-1000 MW) (mPDMS).

In another embodiment, b is 5 to 400 or from 10 to 300, both terminal $R^1$ comprise monovalent reactive groups, and the remaining $R^1$ are independently selected from monovalent alkyl groups having 1 to 18 carbon atoms, which may have ether linkages between carbon atoms and may further comprise halogen.

In one embodiment, where a silicone hydrogel Ophthalmic Lens is desired, the Ophthalmic Lens of the present invention will be made from a Reactive Mixture comprising at least approximately 20 and preferably between approximately 20 and 70 percent weight silicone-containing Components based on total weight of reactive monomer Components from which the polymer is made.

In another embodiment, one to four $R^1$ comprises a vinyl carbonate or carbamate of Formula II

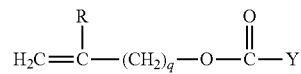

wherein Y denotes O—, S— or NH—; and R denotes hydrogen or methyl; d is 1, 2, 3, or 4; and q is 0 or 1.

The silicone-containing vinyl carbonate or vinyl carbamate monomers specifically include 1,3-bis[4-(vinyloxycarbonyloxy)but-1-yl]tetramethyl-disiloxane; 3-(vinyloxycarbonylthio) propyl-[tris (trimethylsiloxy)silane]; 3-[tris (trimethylsiloxy)silyl] propyl allyl carbamate; 3-[tris (trimethylsiloxy)silyl] propyl vinyl carbamate; trimethylsilylethyl vinyl carbonate; trimethylsilylmethyl vinyl carbonate, and

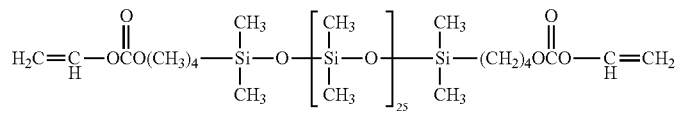

Where biomedical devices with modulus below approximately 200 are desired, only one $R^1$ shall comprise a monovalent reactive group and no more than two of the remaining $R^1$ groups will comprise monovalent siloxane groups.

Another class of silicone-containing Components includes polyurethane macromers of the following formulae:

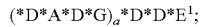

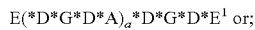

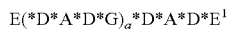    Formulae IV-VI wherein D denotes an alkyl diradical, an alkyl cycloalkyl diradical, a cycloalkyl diradical, an aryl diradical, or an alkylaryl diradical having 6 to 30 carbon atoms;

wherein G denotes an alkyl diradical, a cycloalkyl diradical, an alkyl cycloalkyl diradical, an aryl diradical or an alkylaryl diradical having 1 to 40 carbon atoms and which may contain ether, thio or amine linkages in the main chain;

* denotes a urethane or ureido linkage;

$a$ is at least 1; and

A denotes a divalent polymeric radical of formula:

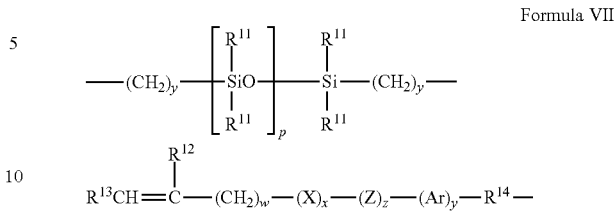    Formula VII wherein $R^{11}$ independently denotes an alkyl or fluoro-substituted alkyl group having 1 to 10 carbon atoms, which may contain ether linkages between carbon atoms; y is at least 1; and p provides a moiety weight of 400 to 10,000; each of E and $E^1$ independently denotes a polymerizable unsaturated organic radical represented by Formula VIII
wherein $R^{12}$ is hydrogen or methyl; $R^{13}$ is hydrogen, an alkyl radical having 1 to 6 carbon atoms, or a —CO—Y—$R^{15}$ radical wherein Y is —O—, Y—S— or —NH—; $R^{14}$ is a divalent radical having 1 to 12 carbon atoms; X denotes —CO— or —OCO—; Z denotes —O— or —NH—; Ar denotes an aromatic radical having 6 to 30 carbon atoms; w is 0 to 6; x is 0 or 1; y is 0 or 1; and z is 0 or 1.

A preferred silicone-containing Component is a polyurethane macromer represented by Formula IX (the full structure may be understood by joining corresponding asterisk regions, * to *,  to )

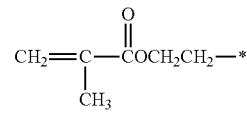

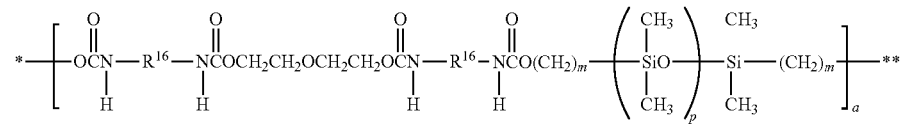

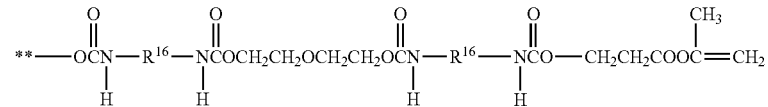

wherein $R^{16}$ is a diradical of a diisocyanate after removal of the isocyanate group, such as the diradical of isophorone diisocyanate. Another suitable silicone-containing macromer is a compound of formula X (in which x+y is a number in the range of 10 to 30) formed by the reaction of fluoroether, hydroxy-terminated polydimethylsiloxane, isophorone diisocyanate and isocyanatoethylmethacrylate. Formula X (the full structure may be understood by joining corresponding asterisk regions, * to *)

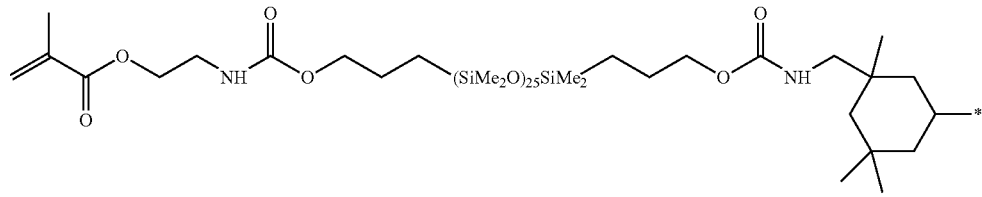

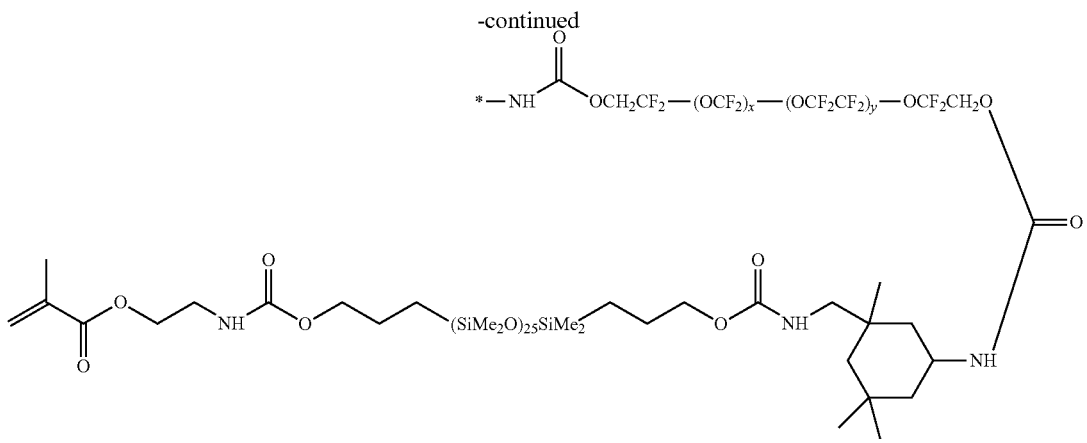

Other silicone-containing Components suitable for use in this invention include macromers containing polysiloxane, polyalkylene ether, diisocyanate, polyfluorinated hydrocarbon, polyfluorinated ether, and polysaccharide groups; polysiloxanes with a polar fluorinated graft or side group having a hydrogen atom attached to a terminal difluoro-substituted carbon atom; hydrophilic siloxanyl methacrylates containing ether and siloxanyl linkages and crosslinkable monomers containing polyether and polysiloxanyl groups. Any of the foregoing polysiloxanes can also be used as the silicone-containing Component in this invention.

CONCLUSION

The present invention, as described above and as further defined by the claims below, provides methods for forming an Ophthalmic Lens that encapsulates a Rigid Insert, wherein the Rigid Insert may be tailored to correct specific astigmatic characteristics of an eye and apparatus for implementing such methods, as well as Ophthalmic Lenses formed with the Rigid Inserts.

The invention claimed is:

1. An ophthalmic lens device for placement on an eye comprising:
   a lens comprising a biocompatible material; and
   a rigid insert comprising a first zone and a second zone, wherein the first zone has a first power and first angle of refraction and wherein the second zone has a second power and second angle of refraction and wherein the first zone is offset from the center of the eye, and the second zone is radially asymmetrical.

2. The ophthalmic lens device of claim 1, wherein a three-dimensional topography provides correction for astigmatic vision.

3. The ophthalmic lens device of claim 2, wherein said three-dimensional topography substantially mirrors the astigmatic characteristics of the eye.

4. The ophthalmic lens device of claim 1, wherein each of the first and the second zone is capable of mirroring an astigmatic characteristic of the eye.

5. The ophthalmic lens device of claim 1, wherein said lens has a three-dimensional topography.

6. The ophthalmic lens device of claim 5, wherein the three-dimensional topography of the lens enhances a corrective property of the rigid insert.

7. The ophthalmic lens device of claim 1, further comprising at least one stabilizing feature for orienting the lens device on the eye.

8. The ophthalmic lens device of claim 7, wherein said stabilizing feature orients the lens device to align the three-dimensional topography of the rigid insert with the astigmatic vision characteristics of the eye.

9. The ophthalmic lens device of claim 8, wherein the stabilizing feature alters the front curve surface of the lens.

10. The ophthalmic lens device of claim 9, wherein the stabilizing feature projects from the front curve surface of the lens.

11. The ophthalmic lens device of claim 8, wherein the stabilizing feature adds sufficient mass to ballast the ophthalmic lens device.

12. The ophthalmic lens device of claim 1, wherein at least one of the rigid insert and lens provide polarization.

13. The ophthalmic lens device of claim 1, wherein at least one of the rigid insert and lens comprises a region of coloration.

14. The ophthalmic lens device of claim 1, wherein said rigid insert further comprises an active agent.

15. The ophthalmic lens device of claim 1, wherein said zones comprise materials of different density.

16. The ophthalmic lens device of claim 1, wherein said zones comprise areas of differing refractive index.

* * * * *